(12) United States Patent
Brizard

(10) Patent No.: US 10,545,253 B2
(45) Date of Patent: Jan. 28, 2020

(54) AUV BASED SEISMIC ACQUISITION SYSTEM AND METHOD

(71) Applicant: CGG SERVICES SAS, Massy (FR)

(72) Inventor: Thierry Brizard, Ollainville (FR)

(73) Assignee: CGG SERVICES SAS, Massy (FR)

( * ) Notice: Subject to any disclaimer, the term of this patent is extended or adjusted under 35 U.S.C. 154(b) by 179 days.

(21) Appl. No.: 15/508,300

(22) PCT Filed: Sep. 11, 2015

(86) PCT No.: PCT/IB2015/001891
§ 371 (c)(1),
(2) Date: Mar. 2, 2017

(87) PCT Pub. No.: WO2016/038453
PCT Pub. Date: Mar. 17, 2016

(65) Prior Publication Data
US 2017/0242144 A1    Aug. 24, 2017

Related U.S. Application Data

(60) Provisional application No. 62/049,390, filed on Sep. 12, 2014.

(51) Int. Cl.
*G01V 1/38*     (2006.01)
*B63G 8/00*     (2006.01)
*G05D 1/10*     (2006.01)

(52) U.S. Cl.
CPC ........... *G01V 1/3817* (2013.01); *B63G 8/001* (2013.01); *G01V 1/3808* (2013.01); *G05D 1/10* (2013.01)

(58) Field of Classification Search
CPC .... G01V 1/3817; G01V 1/3808; B63G 8/001; G05D 1/10
See application file for complete search history.

(56) References Cited

U.S. PATENT DOCUMENTS

| | | | | |
|---|---|---|---|---|
| 5,894,450 A | * | 4/1999 | Schmidt | H04B 13/02 367/131 |
| 8,509,030 B2 | * | 8/2013 | Napolitano | G01S 1/80 367/127 |
| 8,717,844 B2 | * | 5/2014 | Welker | B63B 27/36 181/122 |
| 8,881,665 B2 | | 11/2014 | Brizard et al. | |
| 9,090,319 B2 | | 7/2015 | Brizard et al. | |

(Continued)

FOREIGN PATENT DOCUMENTS

GB    2503692 A    1/2014
WO    2015/125014 A2    8/2015

OTHER PUBLICATIONS

International Search Report in related International Application No. PCT/IB2015/001891, dated Mar. 3, 2016.

(Continued)

*Primary Examiner* — Krystine E Breier
(74) *Attorney, Agent, or Firm* — Patent Portfolio Builders PLLC

(57) ABSTRACT

An autonomous underwater vehicle (AUV) for guiding other AUVs during a marine seismic survey. The guiding AUV includes a housing; a propulsion system located inside the housing; and an acoustic positioning system attached to an outside the housing. The acoustic positioning system emits at least three chirps from three different locations.

18 Claims, 10 Drawing Sheets

(56) References Cited

U.S. PATENT DOCUMENTS

| | | | |
|---|---|---|---|
| 9,417,351 B2* | 8/2016 | Brizard | G01V 1/3843 |
| 9,423,522 B2* | 8/2016 | Muyzert | G01V 1/3843 |
| 9,457,331 B2* | 10/2016 | Siliqi | B01J 8/008 |
| 9,625,597 B2* | 4/2017 | Grimsdale | G01V 1/3835 |
| 9,669,912 B2* | 6/2017 | Hesse | B63G 8/001 |
| 2011/0038230 A1 | 2/2011 | Napolitano et al. | |
| 2011/0297070 A1 | 12/2011 | Riggs et al. | |
| 2013/0003503 A1 | 1/2013 | L'Her et al. | |
| 2013/0083623 A1 | 4/2013 | Brizard et al. | |
| 2013/0258806 A1 | 10/2013 | Siliqi | |
| 2014/0177387 A1 | 6/2014 | Brizard | |
| 2015/0276959 A1 | 10/2015 | Grimsdale | |

OTHER PUBLICATIONS

Written Opinion of the International Searching Authority in related International Application No. PCT/IB2015/001891, dated Mar. 3, 2016.

Deffenbaugh et al., "The Relationship between Spherical and Hyperbolic Positioning"; Oceans '96, MTS/IEEE, Prospects for the 21st Century, Conference Proceedings; 1996; pp. 590-595.

Office Action in related U.S. Appl. No. 15/117,858 dated Mar. 20, 2018. (All references not cited herewith have Deen previously made of record.).

Singh, et al.; "An Integrated Approach to Multiple AUV Communications navigation and Docking"; Oceans '96, MTS/IEEE; Prospects for the 21st Century, Conference Proceedings; 1996; pp. 59-64.

* cited by examiner

AUV BASED SEISMIC ACQUISITION SYSTEM AND METHOD

BACKGROUND

Technical Field

Embodiments of the subject matter disclosed herein generally relate to methods and systems and, more particularly, to mechanisms and techniques for performing a marine seismic survey using autonomous underwater vehicles (AUVs) that carry appropriate seismic sensors and use one or more guiding AUVs for navigation.

Discussion of the Background

Marine seismic data acquisition and processing generate a profile (image) of a geophysical structure under the seafloor. While this profile does not provide an accurate location of oil and gas reservoirs, it suggests, to those trained in the field, the presence or absence of these reservoirs. Thus, providing a high-resolution image of geophysical structures under the seafloor is an ongoing process.

Reflection seismology is a method of geophysical exploration to determine the properties of earth's subsurface, which is especially helpful in determining the above-noted reservoirs. Marine reflection seismology is based on using a controlled source of energy that sends energy into the earth. By measuring the time it takes for the reflections and/or refractions to come back to plural receivers, it is possible to evaluate the depth of features causing such reflections. These features may be associated with subterranean hydrocarbon deposits.

A traditional system for generating seismic waves and recording their reflections off the geological structures present in the subsurface uses at least one large vessel that tows an array of seismic receivers provided on streamers. The vessel also tows a seismic source array configured to generate seismic waves. The seismic waves propagate downward toward the seafloor and penetrate it until a reflecting structure (e.g., reflector) eventually reflects the seismic waves. The reflected seismic waves propagate upward until they are detected by the receiver(s) on the streamer(s). Based on the data collected by the receiver(s), an image of the subsurface is generated.

However, this traditional configuration is expensive because the cost of streamers and the cost of operating this system are high. In addition, this conventional technology acquires the seismic data with considerable noise because of the receivers' closeness to the water surface and due to the noise that propagates through the streamers.

New technologies (see, e.g., patent application Ser. Nos. 14/440,241 and 14/104,376, both belonging to the assignee of this application, the content of which is incorporated by reference into this application) deploy plural AUVs for collecting the seismic data at a greater depth than the streamers. However, maintaining the plural AUVs along desired travel paths have been shown to be challenging.

Accordingly, it would be advantageous to provide a navigation system for the plural AUVs so that each of them follows a desired path.

SUMMARY

According to one exemplary embodiment, there is a guiding autonomous underwater vehicle (AUV) for guiding other AUVs during a marine seismic survey. The guiding AUV includes a housing, a propulsion system located inside the housing, and an acoustic positioning system attached to an outside the housing. The acoustic positioning system emits at least three chirps from three different locations.

According to another embodiment, there is a marine acquisition seismic system having a guiding autonomous underwater vehicle (AUV), plural guided AUVs that correct their paths based on information from the guiding AUV; and a support vessel configured to determine an absolute position of the guiding AUV. The guiding AUV and the guided AUVs drift under water at a given depth.

According to still another embodiment, there is a method for guiding autonomous underwater vehicles (AUVs) during a marine seismic acquisition survey. The method includes driving a guiding AUV along a given path; emitting at least three chirps from an acoustic positioning system attached to, and located outside of, the guiding AUV; recording the at least three chirps at a guided AUV; calculating a relative position of the guided AUV relative to the guiding AUV; adjusting a location of the guided AUV, with a propulsion system, if a difference between the relative position and a given position stored on board is larger than a given threshold; and recording seismic data with the guided AUVs. The guiding AUV drifts with water currents during the seismic survey and uses the propulsion system only to correct its position.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
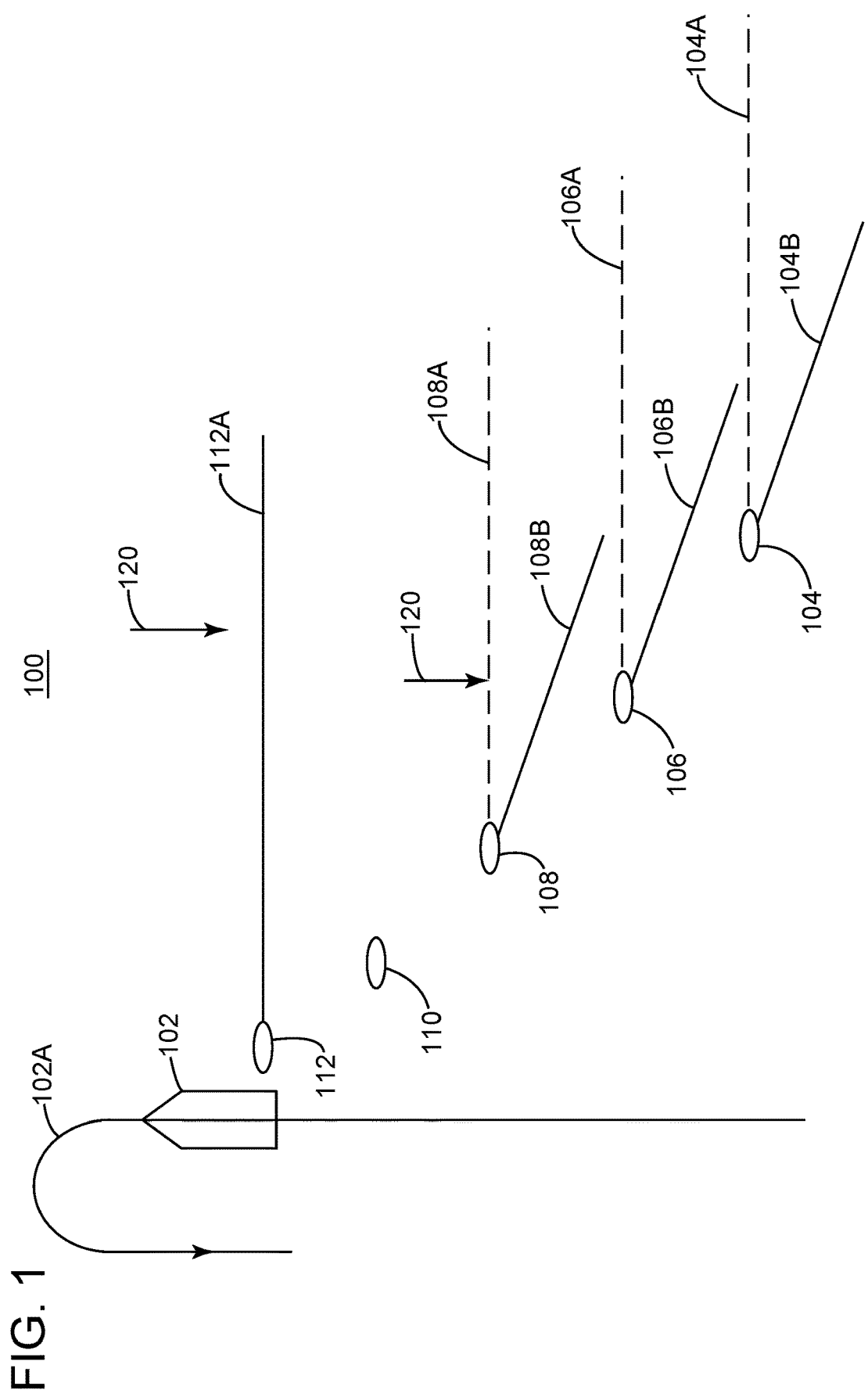
FIG. 1 is a schematic diagram of a seismic survey system that uses AUVs.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of plural AUVs being guided by a guiding AUV. However, the embodiments to be discussed next are not limited to a single guiding AUV, but they may be applied to plural guiding AUVs.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a seismic acquisition system includes a set of AUVs that drift underwater at a given depth while recording seismic data. The set of AUVs does not use a propulsion system for most of the recording time, but only the underwater currents. However, from time to time, an internal controller of guided AUV, calculate their positions relative to a guiding AUV and adjusts their positions if a deviation from a pre-plot position is larger than a given threshold. A guiding AUV may include a housing, a propulsion system located inside the housing, and an acoustic positioning system attached to an outside the housing. Optionally, the guiding AUV may include a seismic sensor for detecting seismic waves. The acoustic positioning system emits at least three chirps from three different locations. More details about this system and the guiding AUV are now discussed.

A marine seismic system employs plural AUVs, each carrying a seismic sensor (e.g., a 4C seismic sensor) and each traveling along a desired path. Methods and devices for launching and recovering these AUVs are disclosed, for example, in patent Ser. No. 13/616,396, Deployment and Recovery of Autonomous Underwater Vehicles for Seismic Survey, filed on Sep. 14, 2012; patent Ser. No. 13/616,481, Autonomous Underwater Vehicle for Marine Seismic Surveys, filed on Sep. 14, 2012; and patent Ser. No. 13/616,327, Deployment and Recovery Vessel for Autonomous Underwater Vehicle for Seismic Survey, all assigned to the assignee of this patent application and the content of all of them being incorporated herein by reference. After the AUVs are deployed underwater, they are supposed to travel along pre-plots. A pre-plot is a path or trajectory calculated prior to launching the seismic survey and intended to be followed by the AUV. Each AUV may have its own pre-plot. A certain number of pre-plots is calculated to cover the entire area supposed to be surveyed. When the recording phase is over, the AUVs may be instructed to surface, and they are collected by a recovery vessel for maintenance and seismic data transfer.

However, following the pre-plots has proved to be challenging, especially when the AUVs are located in an area with strong under water currents. Even if their propulsion systems are used to correct the actual path, because of the small size of the AUVs and because they have to stay under water for weeks if not months, the current AUVs cannot carry a considerable amount of power for the propulsion system. Thus, the correction offered by the propulsion system is limited.

In this regard, FIG. 1 shows a marine seismic acquisition system 100 that includes a vessel 102 and plural AUVs 104-112. The AUVs are launched from vessel 102, which follows a given path 102A, and each AUV is supposed to follow its pre-plot, 104A, 106A, etc. However, due to the underwater current 120, the actual paths 1046, 1066, etc. followed by the AUVs are different from the pre-plots, most likely making an angle with the pre-plot. This is happening because at these depths, the ocean currents 120 are strong.

Although the AUVs may have their own propulsion system, in addition to a buoyancy system, it is difficult to use the propulsion system for maintaining the AUVs along the desired pre-plots for the following reasons. Under water, the AUVs cannot receive GPS signals for determining their exact position. Thus, an acoustic system hosted by a support surface vessel may be employed for communicating the geographical location of each AUV. However, to determine the accurate location of each AUV, the support surface vessel needs to have a powerful and accurate location system. Even with such a system, given the fact that many AUVs are floating under water around the support surface vessel, makes the detection and location of each AUV challenging.

According to an embodiment, it is possible to design a new acquisition system that overcomes the above noted obstacles by letting the AUVs drift with the current. In this way, their actual paths do not have to be corrected as often as a traditional AUV system requires. Thus, according to this embodiment, instead of having a base station or support surface vessel that locates each AUV, a guiding AUV is associated with a group (set or subset of the totality of the AUVs) of AUVs (called herein the guided AUVs) and the guided AUVs self-detect their underwater position based on the position of the guiding AUV. The guiding AUV and the guided AUV flow with the drift and while the guiding AUV does not have to correct its position at all, the guided AUVs need, from time to time, to correct their position relative to the guiding AUV. In other words, this system drifts under water at a desired depth, following the guiding AUV, and does not require that each AUV follows a pre-determined pre-plot. The guided AUVs are assigned a certain location relative to the guiding AUV and the guided AUVs measure their location and correct it when the measured location is too far from the assigned location relative to the guiding AUV. A support vessel, as discussed later, may be used to determine the absolute position of the guiding AUV, and thus, implicitly, the absolute position of the guided AUVs, and transmit this or these positions to one or more source vessels belonging to the seismic survey for coordinating the shooting of the seismic sources.

This AUV based marine acquisition system uses two phases for collecting the seismic data. The first phase involves the guiding AUV communicating with guided AUVs for aligning themselves relative to the guiding AUV. The propulsion system of the guided AUV is sporadically used to correct their trajectories relative to the guiding AUVs as the time passes. However, the guided AUVs mainly follow the underwater currents for advancing along their pre-plots. The second phase involves the guiding AUV and a support vessel that has access to GPS data. Communication between the guiding AUV and the support vessel is established for accurately detecting the guiding AUV's location. Once the guiding AUV's location is achieved, this information is sent to the sources for coordinating their shooting.

These two phases are now discussed in more detail with regard to an acquisition system that includes a guiding AUV, guided AUVs and a support vessel. According to an embodiment illustrated in FIG. 2, guiding AUV 200 includes, besides a housing 202 that hosts most of the AUV's components (which are discussed later), an external acoustic positioning system 204, which is attached to an outside the housing 202. Acoustic positioning system 204 includes a frame 206 and at least three acoustic pingers 208 distributed on the frame so that they do not lay along a straight line. Frame 206 is attached to the AUV's housing by a support mechanism 210, which may include one or more struts and/or brackets. In one application, a length of the acoustic positioning system (e.g., about 2 m) is larger than a length of the housing (e.g., about 1 m). In one embodiment, the acoustic positioning system is similar to a cage and it encloses the AUV. In one embodiment, the AUV is fully enclosed by the acoustic positioning system.

Figure 2:
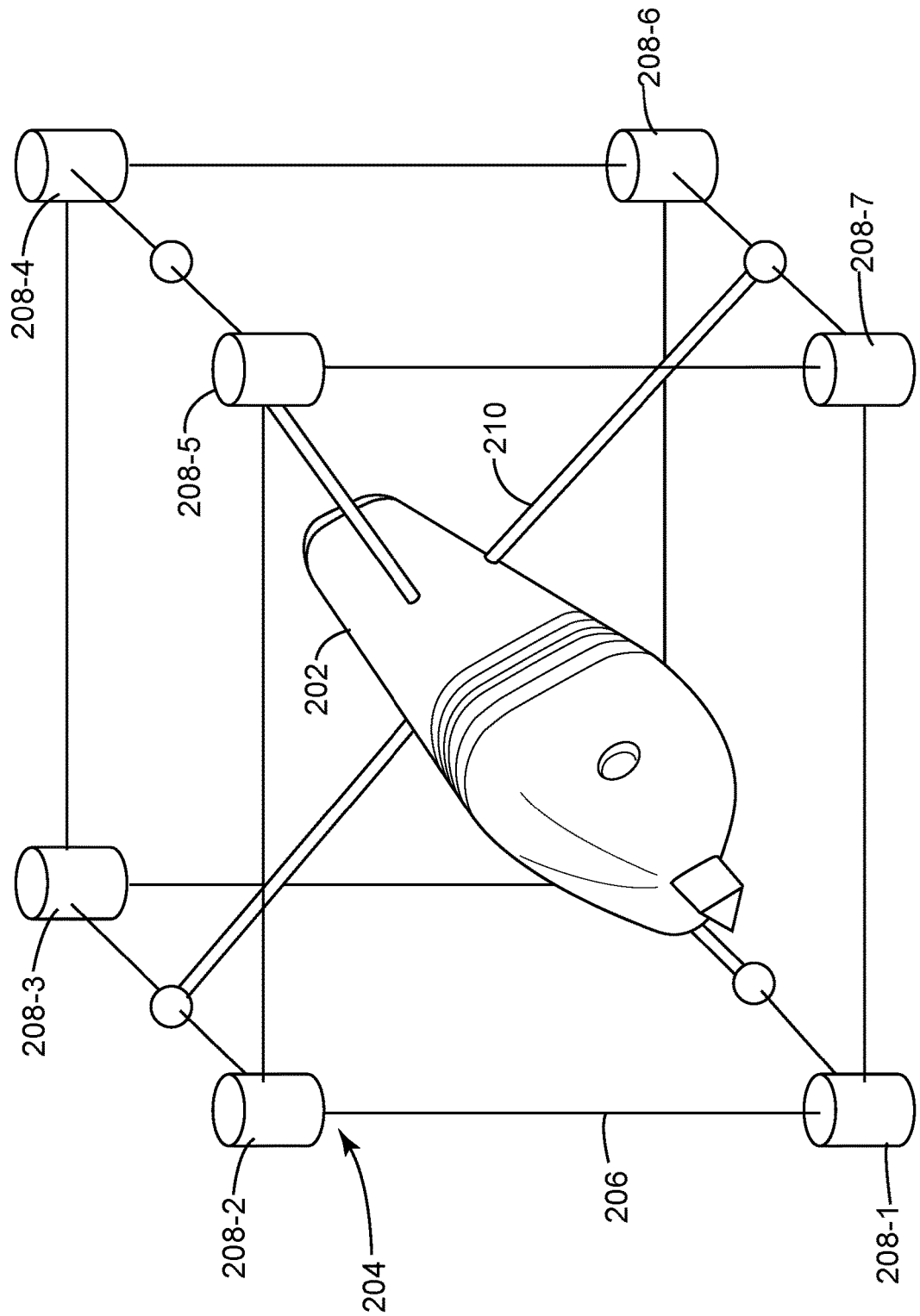
FIG. 2 is a schematic diagram of a guiding AUV having an external acoustic positioning system.

FIG. 2 shows frame 206 having the shape of a cube and including a pinger at each corner of the cube. In one application, the side of the cube is about 2 m. In another application, the size of the cube is smaller than 2 m. The frame may be made from metal, plastic or a polymeric material that offer enough support and strength to maintain the pingers at given positions away from the housing 202. While this is one possible configuration for the acoustic positioning system, those skilled in the art would know that the frame may have any other shape that is capable of supporting at least three pingers. In one application, the acoustic pingers may be positioned upon a surface of, or along an edge of the frame, which may have a polyhedral structure or is similar to a cage. While more pingers are preferred for increasing the accuracy of locating the guided AUVs, the embodiments discussed herein work with only three pingers.

A pinger may be configured to synchronously emit a periodic chirp, for example, every second, on different frequency channels. A pinger is any type of transducer that converts electrical signals to acoustic waves under water. An example of a pinger may be a hydrophone that is used for seismic detection. In one application, the pinger is a piezoelectric transducer. However, other types of transducers may be used, for example, electro-magnetic. The chirp is an individual acoustic signal generated by a given pinger. A frequency channel is any suitable chirp modulation/demodulation process that enables a receiver of the chirp to identify the particular emitter (pinger) of the chirp and to measure the time of arrival of the start of the chirp. The modulation scheme is chosen in order to provide a good compromise between signal length, signal strength, signal separation, and arrival time measurement. Such schemes include, but are not limited to Frequency Hopping Spread Spectrum (FHSS), Direct-Sequence Spread Spectrum (DSSS) and Orthogonal Frequency-Division Multiplexing (OFDM), etc.

Figure 3:
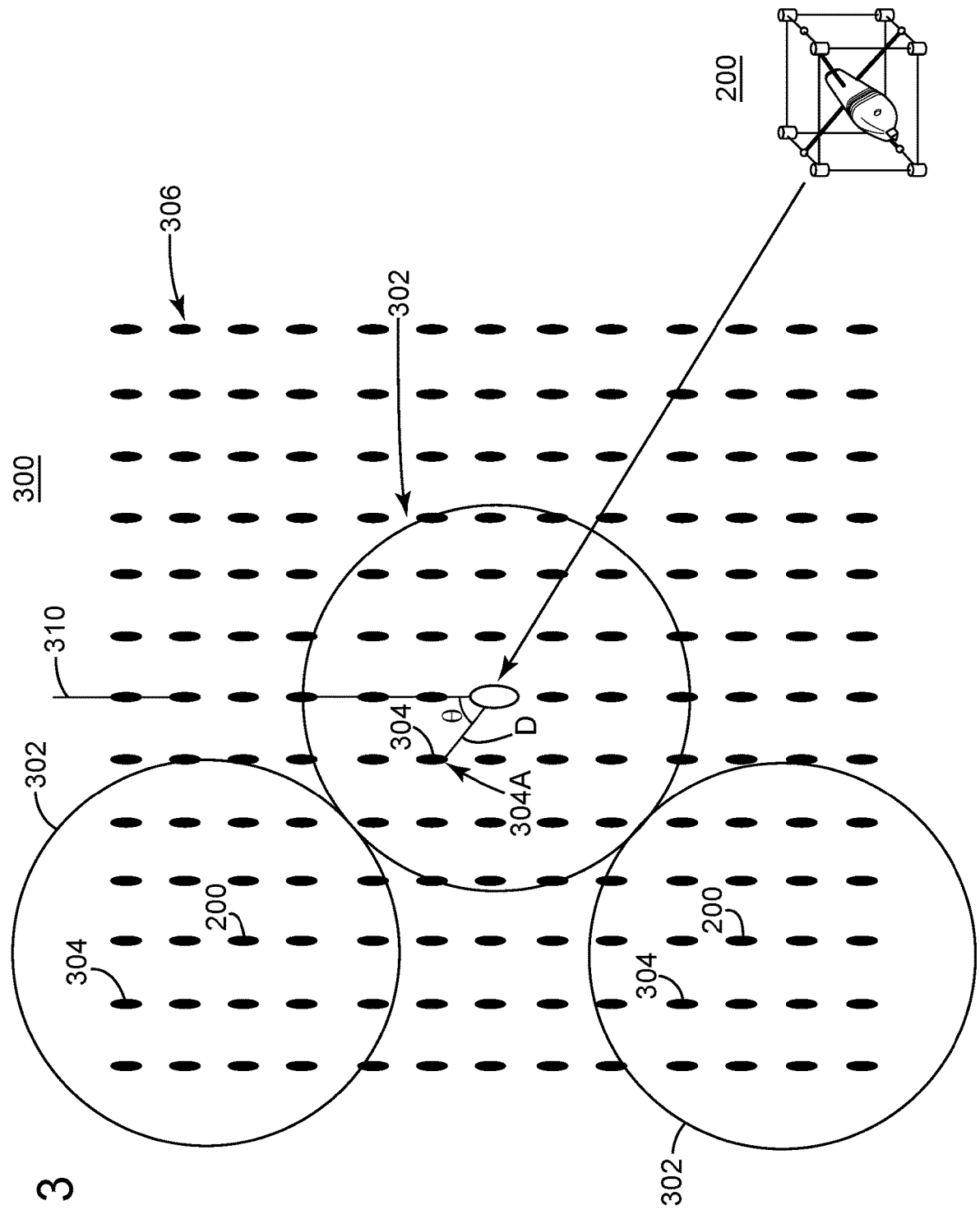
FIG. 3 is a schematic diagram of a seismic survey system having multiple guiding AUVs.

According to the first phase, in one embodiment, the corners of the frame 206 form a "transmitting cube" and each corner has a single pinger, thus emitting eight chirps, which are received by hydrophones or any other type of transducer on one or more of the guided AUVs 304, which are shown in FIG. 3. FIG. 3 shows an acquisition system 300 that includes at least one guiding AUV 200 and a subset 302 of guided AUVs 304 that align themselves relative to the guiding AUV 200. System 300 includes a set of AUV 306 and the subset 302 is associated with the guiding AUV 200. The remaining AUVs in set 306 may also be grouped in various sets and associated with a corresponding guiding AUV.

Figure 4:
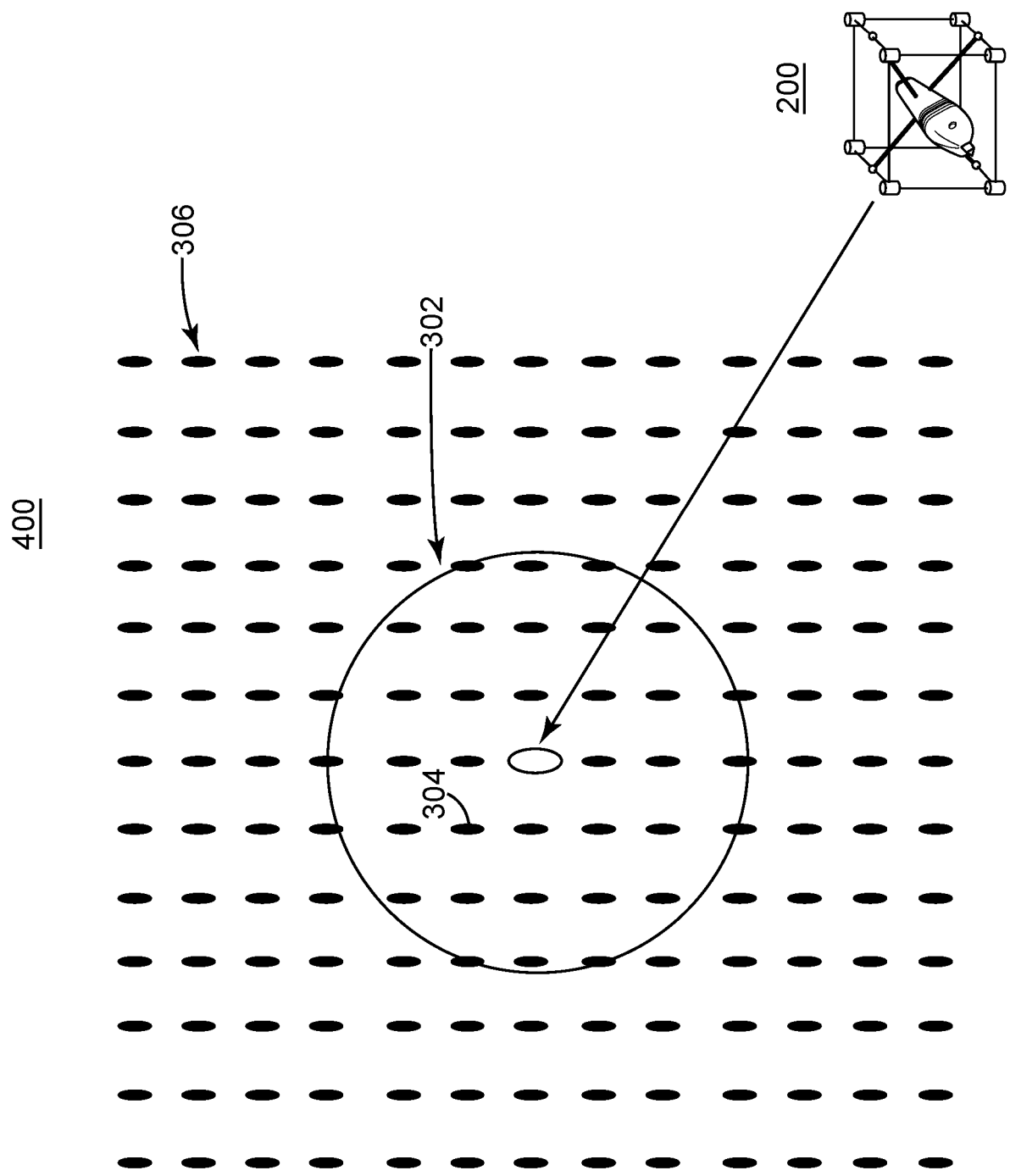
FIG. 4 is a schematic diagram of a seismic survey system having a guiding AUV, guided AUVs and peripheral AUVs.

In another embodiment illustrated in FIG. 4, the remaining AUVs in set 306 are called the "peripheral" AUVs, and the subset 302 of AUVs form the core AUVs. In this application, the peripheral AUVs are guided by relative positioning relative to the core AUVs using an acoustic pinger and a phased acoustic receive array while the core AUVs are guided by the guiding AUV 200. This method of positioning and navigating plural peripheral AUVs relative to core AUVs has been disclosed in PCT patent application no. PCT/162015/000340, filed by the assignee of this application on February 2015, entitled "Method and Autonomous Underwater Vehicle Able to Maintain a Planned Arrangement."

Returning to FIG. 3, the guided AUVs 304, which do not have an acoustic positioning system 204, are able to calculate their position in 3 dimensions (axes X, Y and Z) relative to the corresponding guiding AUV 200. The guided AUVs 304 calculate in a processor located on board, as will be discussed later, their positions by, for example, triangulation. If a guided AUV 304 determines that its calculated position relative to the guiding AUV 200 does not coincide with its targeted position within a given tolerance, the guided AUV 304 activates its propulsion and/or steering system to regain its intended position relative to the guiding AUV 200. Note that in this embodiment the guiding AUV 200 follows a path 310, which is dictated by the underwater currents, while the guided AUVs just maintain their relative position relative to the guiding AUV 200.

The guided AUVs 304 and the guiding AUV 200 have synchronized timers and the guiding AUV 200 may transmit its chirps at pre-planned times, which may be variable in time or having a constant delay or they may be continuous or intermittent emissions. Each guided AUV 304 measures the precise time of arrival of the chirps and then calculates its position relative to the guiding AUV 200, by taking into account the difference between transmission time and arrival time and multiplying this difference by the speed of sound in water. The guided AUV 304 may also calculate its bearing relative to the guiding AUV 200 by measuring the differences in travel times between the various guiding AUV's pingers. In this way, the guided AUV can calculate an accurate relative position relative to the guiding AUV. In one embodiment, each guided AUV 304 is given a position 304A relative to the guiding AUV. Position 304A may be described in terms of a distance D relative to the guiding AUV 200 and an angle θ between a heading 310 of the guiding AUV and distance D as illustrated in FIG. 3.

Figure 5:
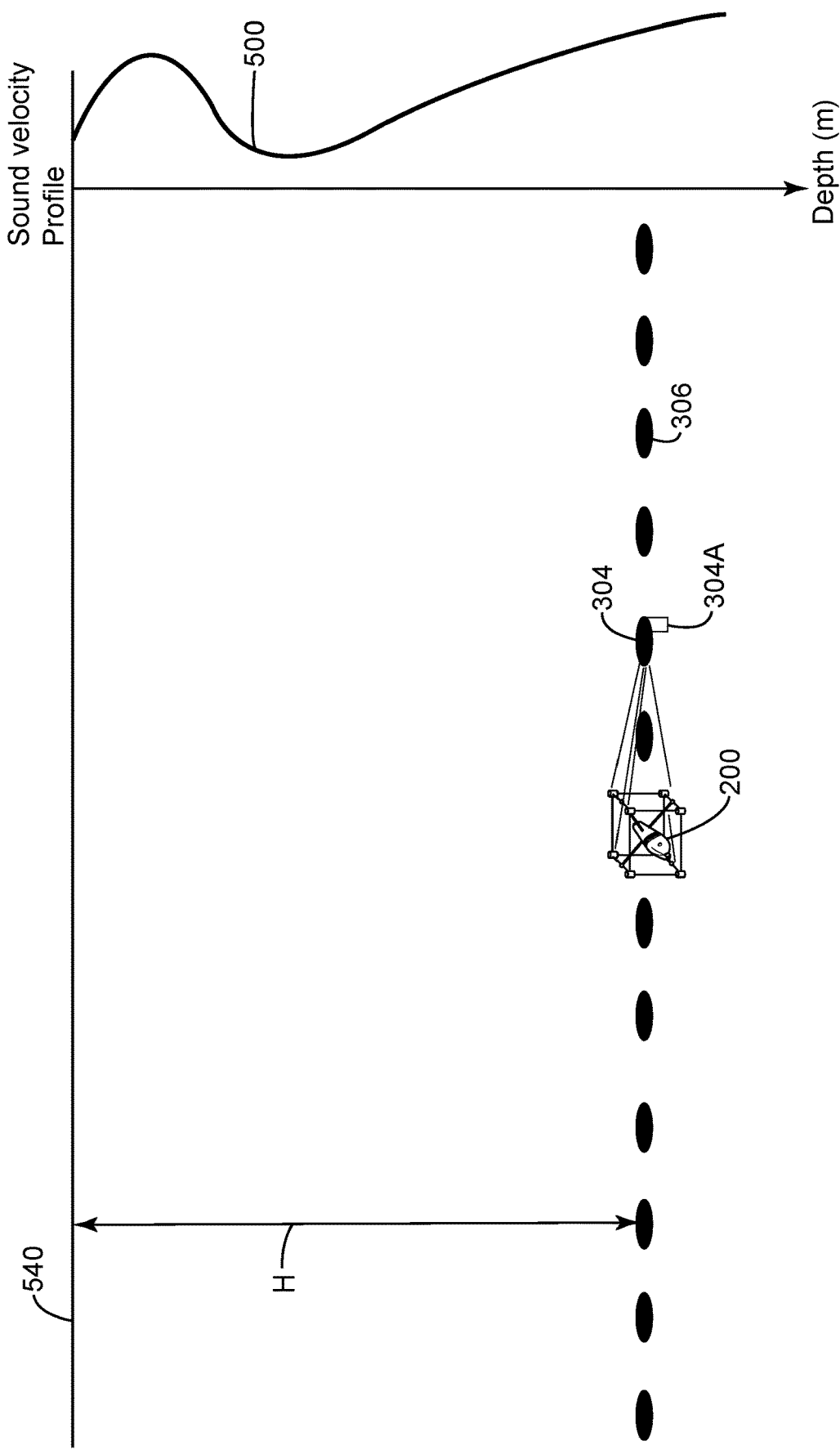
FIG. 5 illustrates how the sound velocity changes with a depth and a configuration of an acquisition system that includes a guiding AUV and guided AUVs.

The speed of sound in water depends on the density of the water as illustrated in FIG. 5. The density, in turn, depends primarily on the temperature and pressure. Thus, the sound speed 500 will usually vary with depth under typical ocean conditions. This variation happens most abruptly at a level known as the thermocline. Because the guiding AUV 200 and the guided AUVs 304 are at approximately the same depth H below the water surface 540, the inaccuracies in distance measurement between the AUVs due to the errors in sound speed are small compared with surface measurement.

However, in order to further reduce the distance inaccuracy caused by errors in sound speed estimation, the AUVs may optionally be provided with a Conductivity Temperature Depth (CTD) device 304A, which allows the AUV to calculate the actual sound velocity at its current position. Also optionally, the guiding AUV 200 may be equipped with a CTD device and it may transmit information about the sound speed to the AUVs 304 using either a separate acoustic modem or by encoding this information in the chirps transmitted by the acoustic positioning system 204. The guided AUV 304 can then improve the accuracy of its calculated position by using the measured value for sound speed at its current position, and/or the measured sound speed at the guiding AUV position, and/or an interpolation of sound speed between the locations of the guiding AUV and guided AUV.

The guided AUVs may record the time of arrival measurements for further processing after recovery. This processing can improve the knowledge of the actual positions of the AUVs. Knowledge of the sound speed in 3D space can enable improved accuracy by taking ray bending into account. Knowledge of seismic shot timing and positioning can be included in the optimization of a cost function including the redundancy in position readings and knowledge of the physical properties of the AUVs and their surrounding environment (e.g., limits in possible ocean current, velocity, acceleration, rate of turn).

Optionally, the guiding AUV may encode in its chirps, information about its heading relative to the inertial plane. This means that the chirp modulation/demodulation process allows coding of information in addition to the identity of the transmitting pinger. Without this information, the guided AUVs have to assume that the guiding AUV follows a pre-defined heading in order to be able to calculate the bearing of the guiding AUV relative to them. Alternatively, the guided AUVs need to study the changes in time of bearing, in order to deduce the required bearing of the guiding AUV relative to them. If the chirp also contains information about the heading of the guiding AUV, then the guided AUVs can use it to directly calculate the required bearing. In the latter case, the guiding AUV may be equipped with an inertial navigation unit or other means for determining its own position and orientation, as discussed later.

In one embodiment, the acquisition system 300 may employ plural guiding AUVs 200. These AUVs employ separate and/or different or encoded frequency channels to avoid or minimize interference between neighbor guiding AUVs. Any given guided AUV will position itself relative to a predetermined master guiding AUV. However, any given guided AUV may also record the times of arrival of one or more other guiding AUVs. That information can then be used in post processing, after recovery of the information from the AUVs, to recalibrate the exact positions in which they were for each seismic shot.

Figure 6:
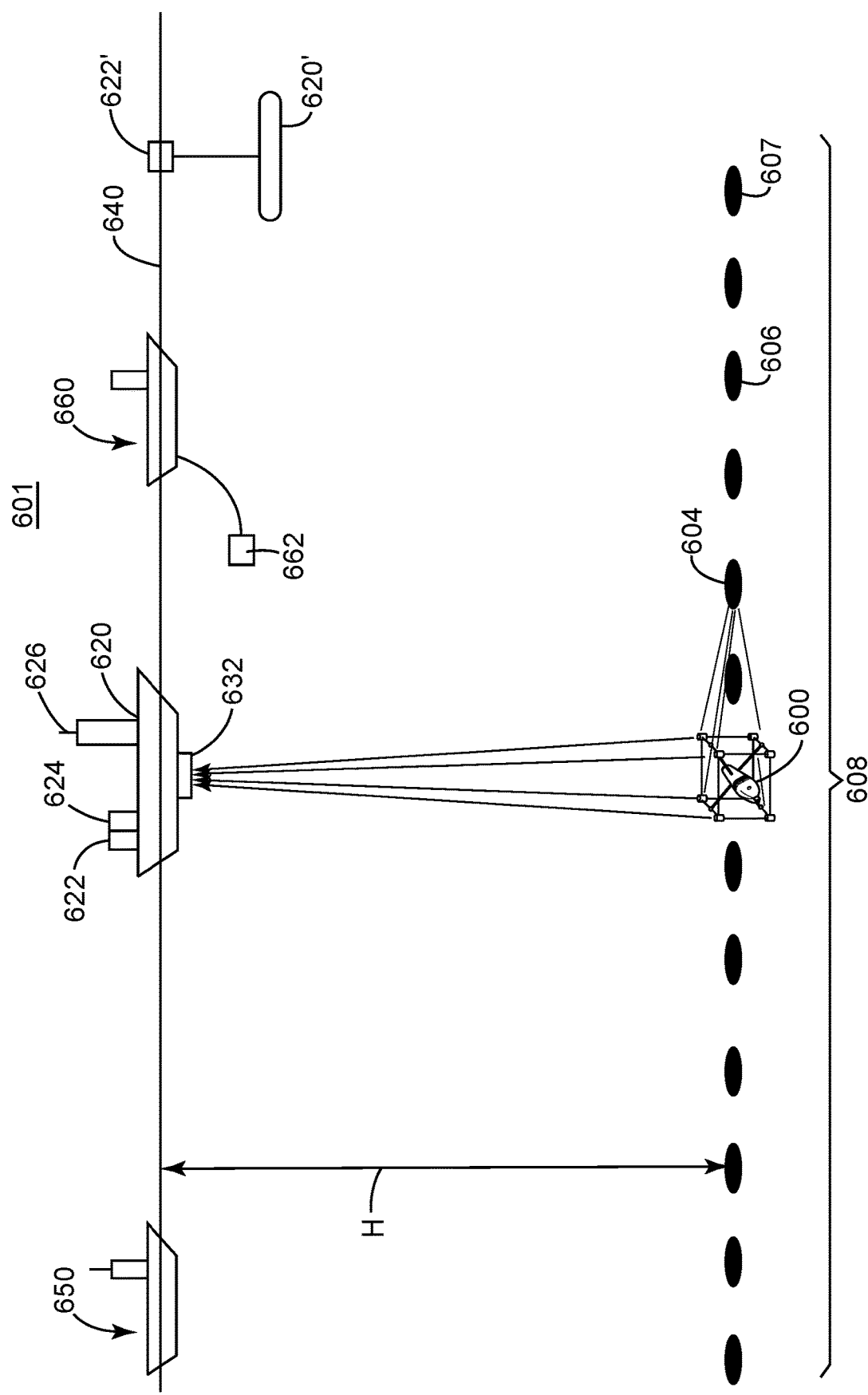
FIG. 6 illustrates a marine acquisition system having a guiding AUV, plural guided AUVs and a support vessel.

According to the second phase, the guiding AUV interacts with a support vessel for determining an absolute and accurate position of the guiding AUV. FIG. 6 shows a marine acquisition system 601 that includes a guiding AUV 600, corresponding guided AUVs 604 and other AUVs 606 (also called peripheral AUV, which have either their own guiding AUV or use the guided AUVs 604 to position themselves as discussed above) drifting underwater at a given depth H. Support vessel 620 is shown in the figure being a surface vessel that floats at the water surface 640. Support vessel 620 has a location device 622 (e.g., a global positioning system, GPS) for accurately determining its geographical location. Those skilled in the art would know that the location device may be a radio device that triangulates its position relative to other seismic vessels (e.g., source vessels) that are part of the seismic survey.

However, in one application, support vessel 620' can be submersed and only have a link to a location device 622' that floats at the water surface, as also shown in the figure.

One function of the support vessel is to obtain an accurate location of itself and this is achieved by using the location device 622. Another function of the support vessel is to track the position of the guiding AUV or the plural guiding AUVs by intercepting its or their transmitting chirps 630. For this reason, the support vessel 620 has a transducer 632 for recording chirps 630. The guiding AUV(s) 600 may also transmit its or their heading and depth to the support vessel 620 via an acoustic modem, which is different from the acoustic positioning system 204.

Combining the positional information of the guiding AUV with the GPS position of the support vessel, the support vessel will regularly calculate the theoretical position of all AUVs involved in the survey. For this calculation, the support vessel uses a computing device that includes at least a processor and a memory and appropriate software. This information may be transmitted from a transceiver 626, by radio link, to a command and control vessel 650 and/or to the shooting vessel 660 in order to adjust shooting positions according to the subsurface positions of the AUVs. Note that shooting vessel 660 tows at least one source array 662 for generating acoustic waves.

In one embodiment, the support vessel may interrogate, from time to time, a given AUV 607, which is located at the periphery of an AUV grid 608 (the grid corresponds to the positions of all the AUVs), to verify its position. The AUV 607 is equipped with acoustic transponders for this purpose. Because the support vessel operates, in certain applications, substantially vertically above the guiding AUV 600, the angle and/or distance measurements are less affected by the ray-bending that can be caused by variations in sound velocity. However, the support vessel may operate within some defined offset from a vertical that intersects with the guiding AUV, in which case the deviation from normal remains geometrically determinable and such a mode may account for natural drift or other causes. The support vessel may be a manned or unmanned surface or underwater vessel.

The AUVs may have a buoyancy control and be pre-programmed to maintain a given depth, as will be discussed later. The depth may be constant for all nodes, may vary from one node to another, and/or may vary in time.

The guiding AUV may drift without propulsion, or it may drift and then use full or partial propulsion to maintain its heading, or it may utilize active propulsion to maintain its heading and position, either according to a pre-plot, or following acoustically transmitted signals from the support vessel, or its position may be maintained due to a physical link (suitable cable) to the surface vessel, buoy or other device. The guiding AUV may be physically attached to a surface vessel using a suitable cable or tether that provides mechanical and/or electrical connectivity.

The guiding AUV may be programmed to maintain the same depth as surrounding guided AUVs. In one embodiment, the guiding AUV has a different depth than the guided AUVs for improving the communication between the guiding AUV and the guided AUVs and also the communication between the guiding AUV and the support vessel.

Figure 7:
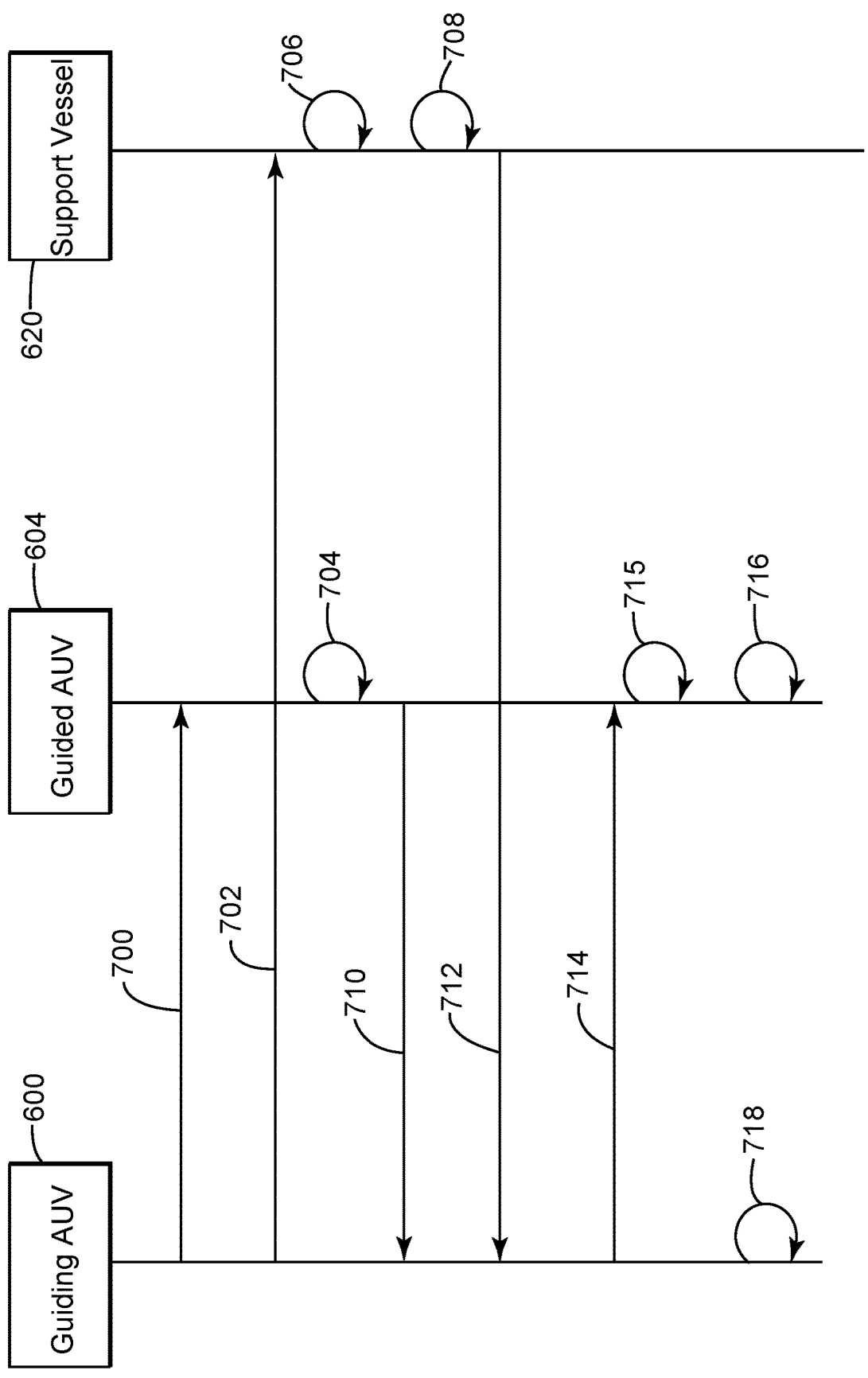
FIG. 7 illustrates signals and commands exchanged among the various entities of the marine acquisition system.

When in use, the acquisition systems discussed in the previous embodiments perform some of the following steps. FIG. 7 is a flowchart illustrating signaling and processes that are happening in the various parts of the acquisition system. Guiding AUV 600 sends one or more chirps, which are received in step 700 by the guided AUVs and in step 702 by the support vessel. Each guided AUV 604 calculates in step 704 its position relative to the guiding AUV 600 and the support vessel 620 calculates in step 706 the guiding AUV 600's position. Support vessel 620 further calculates its own position in step 708 using GPS information. In optional step 710, each guided AUV may send its relative position to the guided AUV or, based on its pre-plot position, can fire its propulsion system in step 716 to correct its position, if the case (i.e., if the measured relative position relative to the guiding AUV 600 is offset from the pre-plot position by a distance larger than a predetermined threshold). The support vessel, after calculating the absolute position of the guiding AUV, sends this information in optional step 712 to the guiding AUV. Guiding AUV, optionally sends its absolute position in step 714 to corresponding guided AUVs so that each guided AUV can calculate its absolute position in step 715. If a difference between the actual position and the pre-plot position for the guided AUV is larger than a given threshold, the guided AUV adjusts its position in step 716. Note that steps 710, 712, 714 and 715 are optional, and not necessary if the guided AUVs adjust their positions relative to the guiding AUVs. These steps are necessary if the operator decides to configured to the guiding AUVs to adjust their measured positions relative to absolute pre-determined positions. However, this last implementation is very energy intensive, and for this reason, disfavored with the AUVs' present state of the art.

Variations and/or modifications of these steps may be implemented as will be recognized by those skilled in the art as long as the guided AUVs can determine their actual positions or relative positions. For example, if the guided AUV determines its actual position as discussed above with regard to steps 714 and 715, the guided AUV then compares the actual calculated position with the pre-plot absolute position. However, if the guided AUV uses only its relative position determined in step 704, then the guided AUV uses a relative pre-plot for comparing to the relative position and adjusts, if necessary, its relative position. As an example, note that a given guided AUV may be instructed to stay 1,000 m away from the guiding AUV, with a 35° heading. The guided AUV can determine both the distance and heading relative to the guiding AUV because of the acoustic positioning system 204 of each guiding AUV 200. In this case, the pre-plot position of the guided AUV is always the same, 1,000 m with a heading of 35°.

Figure 8:
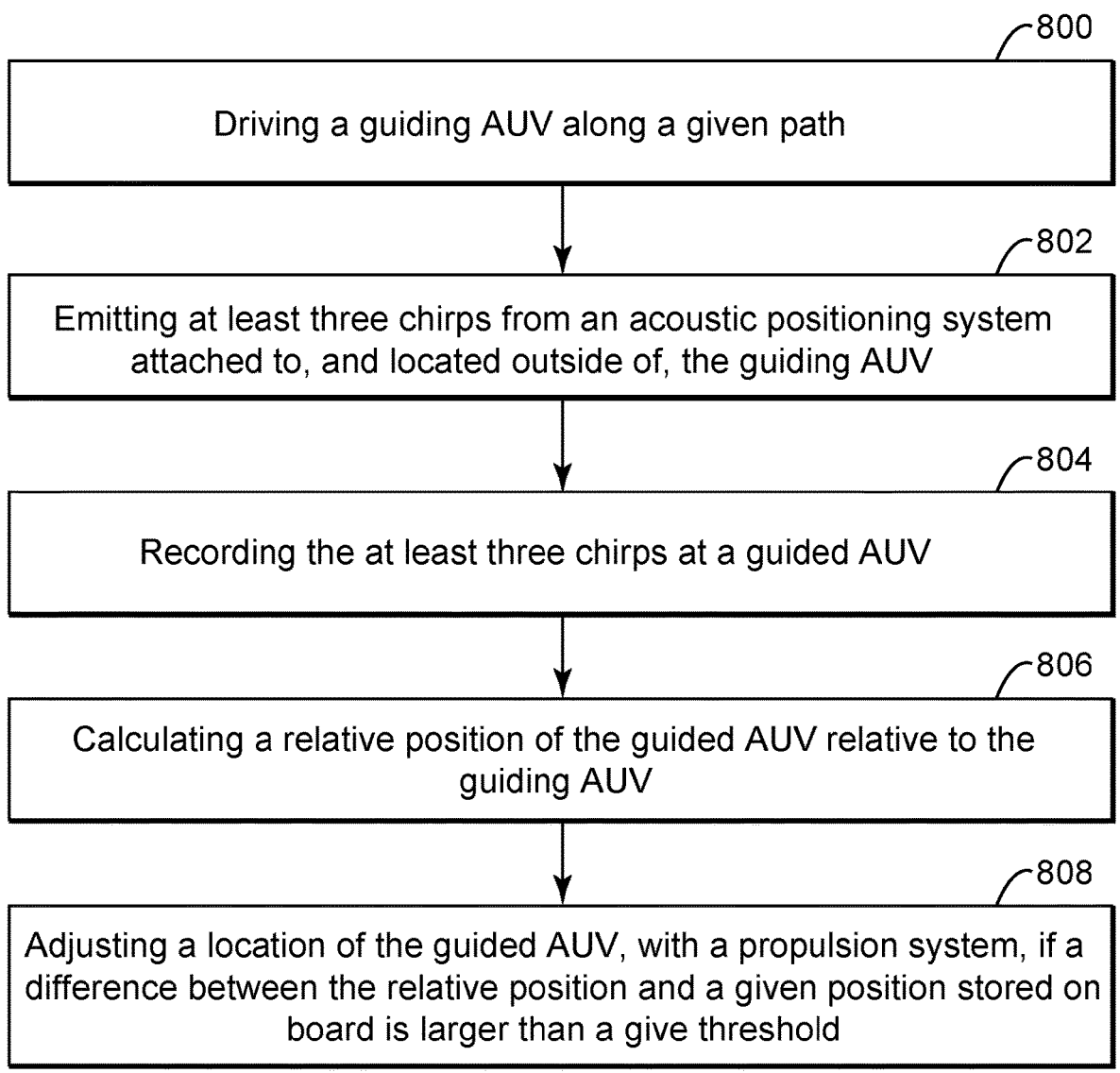
FIG. 8 is a flowchart of a method for acquiring seismic data with guiding and guided AUVs.

A method for collecting seismic data with a guiding AUV and guided AUVs is now discussed with regard to FIG. 8. The method includes a step 800 of driving a guiding AUV along a given path, a step 802 of emitting at least three chirps from an acoustic positioning system attached to, and located outside of, the guiding AUV, a step 804 of recording the at least three chirps at a guided AUV, a step 806 of calculating a relative position of the guided AUV relative to the guiding AUV, and a step 808 of adjusting a location of the guided AUV, with a propulsion system, if a difference between the relative position and a given position stored on board is larger than a given threshold. The guiding AUV drifts with water currents during the seismic survey and uses the propulsion system only to correct its position. The method may also include a step of recording seismic data with the guided AUV. This step can take place after the step of adjusting, or while all the above steps are performed.

One or more of the above discussed embodiments achieves some of the following advantages. The energy consumption will be a fraction of the daily 10 MW consumption of a typical seismic vessel that tows streamers for recording seismic data. From the surface, the present acquisition system has a very low visual impact; it is almost invisible, with a reduced number of small surface vessels in operation. Because the AUV based acquisition system operates relatively deep in the water column (e.g., 100 m), recorded seismic data will be free from swell noise and will have an improved signal-to-noise ratio at lower frequencies. Because the AUV based system is operated without strings (i.e., streamers or other wires) attached, the recorded seismic data will be not polluted by streamer vibrations. Because the guiding and guided AUVs drift with the water current, the recorded seismic data will be free of flow noise. Because the AUV based acquisition system does not require a large support vessel, the recorded seismic data will be less polluted by the vessel's propulsion.

Further, the present system will allow the deployment of a large variety of "synthetic antennas" in 2D or 3D with spacing between the drifting AUVs from 10 m to 800 m. At the operation depth of the AUVs, the attenuation of the reflected wave reduces the ghost impact compared to surface acquisition. Those skilled in the art would also understand that the depth distribution of the AUVs within a swath enables efficient de-ghosting. An appropriate seismic sensors configuration should enable proper separation of up-going and down-going waves.

Figure 9:
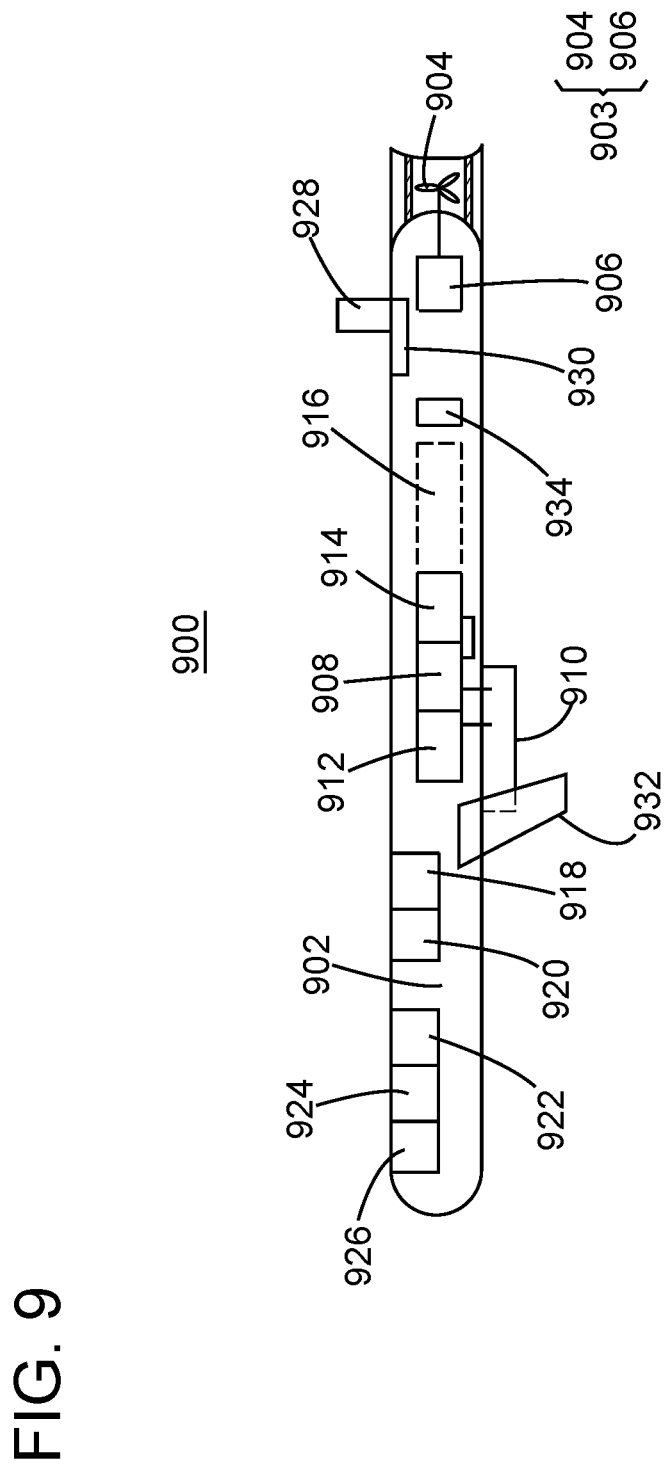
FIG. 9 is a schematic diagram of an AUV.

An exemplary AUV 900 is now discussed with regard to FIG. 9. AUV 900 has a body 902 in which a propulsion system 903 may be located. Propulsion system 903 may include one or more propellers 904 and a motor 906 for activating propellers 904. Alternatively, the propulsion system may include one or more turbines. Motor 906 may be controlled by a processor 908. Processor 908 may also be connected to a seismic sensor 910. The seismic sensor may include one or more of a hydrophone, geophone, accelerometer, etc. For example, if a 4C (four component) survey is desired, seismic sensor 910 includes three accelerometers and a hydrophone, i.e., a total of four sensors. Alternatively, the seismic sensor may include three geophones and a hydrophone. Of course, other combinations of sensors are possible.

A memory unit 912 may be connected to processor 908 and/or seismic sensor 910 for storing seismic data it records and other information as necessary. A battery 914 may be used to power all these components, and it may be allowed to change its position along a track 916 to change the AUV's center of gravity.

The AUV may also include an inertial measurement unit (IMU) 918, which is configured to track the AUV's location. The IMU may include at least a module containing accelerometers, gyroscopes or other motion-sensing devices. The IMU may be initially provided with the current position and velocity of the AUV from another source, for example, a human operator, a GPS satellite receiver, another IMU from the vessel, etc., and thereafter, the IMU computes its own updated position and velocity by integrating (and optionally filtering) information received from its motion sensors and/or information from the pingers from the guiding AUV.

Besides or instead of IMU 918, the AUV may include a compass 920 and other sensors 922 such as, for example, an altimeter for measuring its altitude, a pressure gauge, an interrogator module, etc. AUV 900 may optionally include an obstacle avoidance system 924 and a communication device 926 (e.g., Wi-Fi transceiver) or other data transfer device capable of wirelessly transferring seismic data. In one embodiment, the transfer of seismic data takes place while the AUV is on a vessel. Also, it is possible that the communication device 926 is a port wire-connected to the vessel to transfer the seismic data. One or more of these elements may be linked to processor 908. The AUV further includes an antenna 928 (which may be flush with the body of the AUV) and a corresponding acoustic system 930 for communicating with the guiding AUV and/or with a deploying, recovery or shooting vessel. Stabilizing fins and/or wings 932 for guiding the AUV may be used together with the propulsion system 903 for steering the AUV. However, in one embodiment, the AUV has no fins or wings. The AUV may include a buoyancy system 934 for controlling the depth of the AUV, as will be discussed later.

The acoustic system 930 may be an acoustic modem, i.e., a device capable of receiving acoustic waves and translating them into electrical signals and vice versa. Alternatively or in addition, the acoustic system may include an Ultra-Short Baseline (USBL) system, also sometimes known as Super Short Base Line (SSBL). A complete USBL system includes a transceiver, which is mounted on a pole under a vessel or on the frame of the guiding AUV, and a transponder/responder located on the guided AUV. The processor is used to calculate a position of the guided AUV from the ranges and bearings measured by the transceiver. For example, an acoustic pulse is transmitted by the transceiver and detected by the subsea transponder, which replies with its own acoustic pulse. This return pulse is detected by the transceiver on the vessel or the guiding AUV. The time from transmission of the initial acoustic pulse until the reply is detected is measured by the USBL system and converted into a range. To calculate a subsea position, the USBL calculates both a range and an angle from the transceiver to the guiding AUV. Angles are measured by the transceiver, which contains an array of transducers. The transceiver head normally contains three or more transducers separated by a baseline of, e.g., 10 cm or less.

With regard to the AUV's shape, one possible shape is like a submarine. However, this shape may have various cross-sections. For example, a cross-section of the AUV may be circular. In one exemplary embodiment, the cross-section of the AUV is close to a triangle. More specifically, the cross-section may be a triangle with round corners. This shape (triangular-like shape) may be advantageous when deploying or recovering the AUV on the vessel. For example, the launching (and/or recovery) device of the vessel may have a similar triangular shape and also rolling elements configured to rotate so that the AUV is lifted from the water into the vessel or lowered from the vessel into the sea. The rolling elements may be located on the launching device so there is enough contact with the AUV that the AUV does not slip downward when the rolling elements push the AUV upward. Other shapes may be imagined that could be handled by a launching device.

As discussed above, communication between the AUV and a vessel (deployment, recovery or shooting vessel) may take place using acoustic waves. According to an exemplary embodiment, an acoustic underwater positioning and navigation (AUPN) system may be used. The AUPN system may be installed on any one of the participating vessels and may communicate with the acoustic system 930 of the AUV.

The AUPN system may exhibit high accuracy and long-range performance in both positioning and telemetry modes. These features are obtained due to the automatic beam forming transducers which focus the sensitivity toward its targets or transponders. This beam can not only be pointed in any direction below the vessel, but also horizontally and even upward to the surface because the transducer is sphere-shaped.

Thus, the AUPN is a hydro-acoustic Super Short Base Line—SSBL or USBL—tow tracking system, able to operate in shallow and deepwater areas to proven ranges in excess of 3,000 meters. It is a multi-purpose system used for a wide range of applications, including towfish and towed platform tracking, high-accuracy subsea positioning and telemetry and scientific research.

The AUPN is used to determine the AUV position. In one embodiment, the guiding AUV's actual position is measured with the AUPN and then provided to the guiding AUV.

Figure 10:
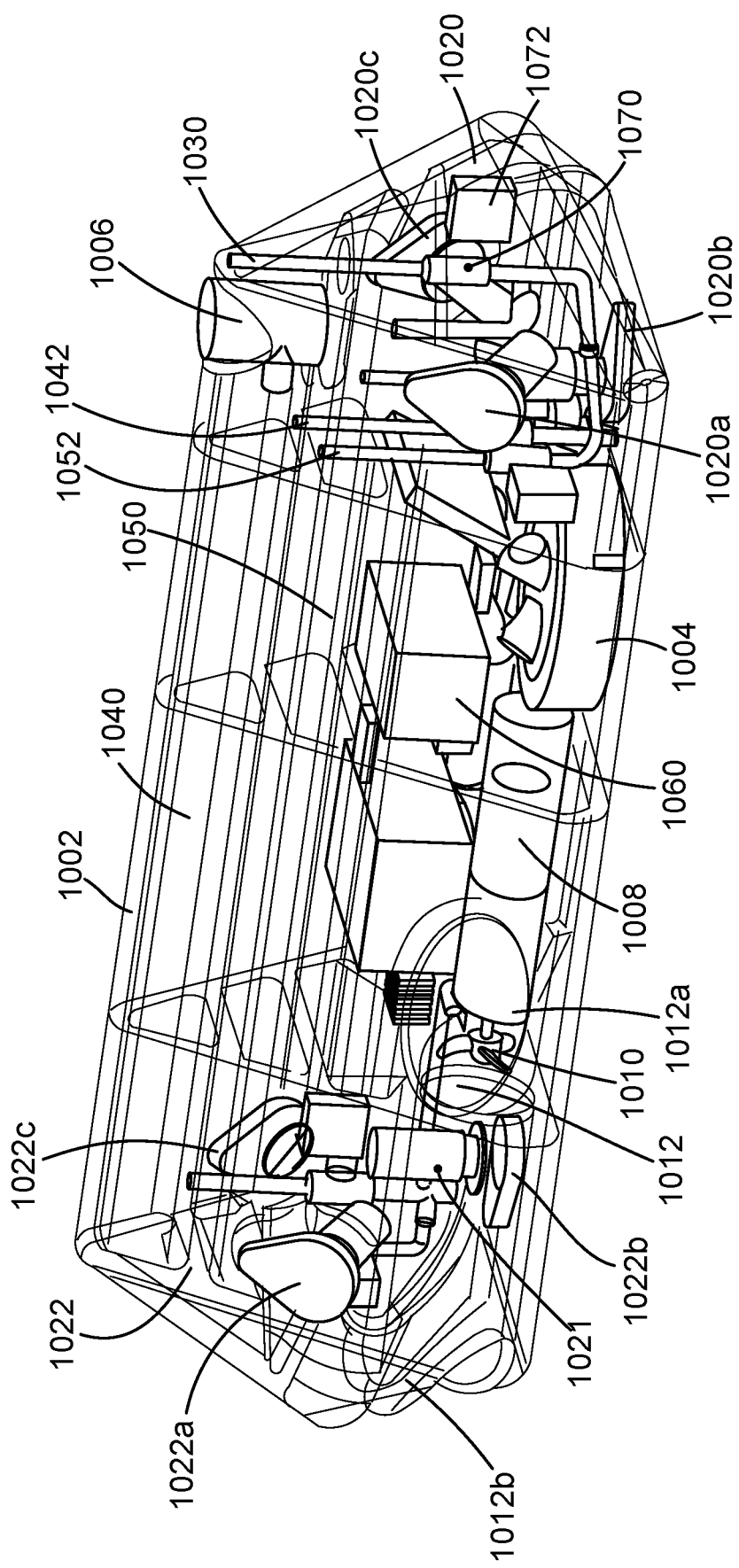
FIG. 10 is another schematic diagram of an AUV.

Next, an AUV 1000 having a buoyancy system that includes two chambers that may be flooded is described with regard to FIG. 10. AUV 1000 has a body 1002 with a triangular-like shape. The body may be shaped differently. Body 1002 includes a payload 1004 (e.g., seismic sensors as discussed above) and an acoustic transceiver 1006 (e.g., an acoustic modem) that may partially extend outside the body 1002. Acoustic transceiver 1006 is configured to communicate with the guiding/guided AUV and/or a vessel and receive acoustic guidance (e.g., acoustic signals from the transducers of the guiding AUV and/or vessel) while traveling along a pre-plot. Alternatively or in addition, the IMU may be used for guidance. Many of the devices discussed in the above embodiments may be present inside the body but, for simplicity, are neither shown nor discussed with regard to this figure.

FIG. 10 also shows a motor 1008 configured to rotate a propeller 1010 for providing thrust to AUV 1000. One or more motors and corresponding propellers may be used. Propeller 1010 receives water through a channel 1012 formed in the body 1002. Channel 1012 has two openings 1012a (intake water element) and 1012b (propulsion nozzle) that communicate with the ambient water. The two openings may be located on the nose, tail or sides of body 1002.

Guidance nozzles or turbines may be provided at nose 1020 and/or tail 1022 of body 1002 for rotation and/or translation control. For simplicity, the guidance nozzles and turbines are identified by the same reference numbers and are used interchangeably herein, although FIG. 10 shows actual turbines. Three guidance nozzles 1020a-c may be located at nose 1020, and three guidance nozzles 1022a-c may be located at tail 1022 of body 1002. The nozzles are connected by piping to corresponding water pumps 1021. If turbines are used, no water pumps are necessary. These water pumps may be used to take in water through various vents (not shown) and guide the water through one or more of the guidance nozzles at desired speeds. Alternatively, the water pumps may take in the water at one guidance nozzle and expel the water at the other nozzle or nozzles. Thus, according to this embodiment, the AUV has the capability to adjust the position of its nose with the guidance nozzles (or turbines) 1020a-c and the position of its tail with the guidance nozzles (or turbines) 1022a-c. However, in other embodiments, only the tail nozzles or only the nose nozzles may be implemented.

FIG. 10 also shows chambers 1040 and 1050 that communicate through piping 1042 and 1052 and vents 1030 with the ambient water so that the chambers may be flooded when desired. A control unit 1060 may instruct the water pump to provide water into one or more of the chambers 1040 and 1050 (to partially or fully flood them) so that the AUV's buoyancy becomes neutral or negative. The same control unit 1060 can instruct the water pump (or use another mechanism) to expel the water from one or more chambers so the AUV's buoyancy becomes positive. Alternatively, control unit 1060 instructs one or more actuators 1070 to fluidly connect vent 1030 to the flooding chamber for making the AUV's buoyancy negative. For making the buoyancy positive, control unit 1060 may instruct a compressed gas tank 1072 to provide compressed gas (e.g., air, $CO_2$, etc.) to the flooding chambers to expel the water, and then the actuator (e.g., valves) 1070 seals closed the emptied flooding chambers.

Although the features and elements of the present invention are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A guiding autonomous underwater vehicle (AUV) for guiding other AUVs during a marine seismic survey, the guiding AUV comprising:
   a housing;
   a propulsion system located inside the housing; and
   an acoustic positioning system attached to an outside the housing, wherein the acoustic positioning system includes a frame holding at least three devices configured to emit at least three chirps from three different locations, respectively.

2. The guiding AUV of claim 1, wherein the at least three devices are pingers.

3. The guiding AUV of claim 2, wherein the at least three pingers are not located along a single line.

4. The guiding AUV of claim 1, wherein a length of the acoustic positioning system is larger than a length of the housing.

5. The guiding AUV of claim 1, wherein the acoustic positioning system includes a frame shaped as a cube and each corner of the cube hosts at least one pinger.

6. A marine acquisition seismic system comprising:
   a guiding autonomous underwater vehicle (AUV);
   plural guided AUVs that correct their paths based on information from the guiding AUV; and
   a support vessel configured to determine an absolute position of the guiding AUV,
   wherein the guiding AUV and the guided AUVs drift with the currents under water at a given depth and use their propulsion systems when a respective difference between (i) a target position relative to the guiding AUV or plural guiding AUVs, which is stored on board, and (ii) a measured position, which is calculated based on at least three chirps emitted by the guiding AUV, is larger than a given threshold.

7. The system of claim 6, wherein the guiding AUV comprises:
   a housing;
   a propulsion system located inside the housing;
   an acoustic positioning system attached to an outside the housing; and
   a seismic sensor for detecting seismic waves,
   wherein the acoustic positioning system emits at least three chirps from three different locations.

8. The system of claim 6, wherein the guiding AUV emits at least three chirps so that each guided AUV among the guided AUVs is enabled to calculate a relative position thereof with regard to the guiding AUV.

9. The system of claim 8, wherein each guided AUV among the guided AUVs adjusts its position based on the calculated relative position and a corresponding target position stored on board of the each guided AUV.

10. The system of claim 6, wherein the support vessel determines the absolute location of the guiding AUV based on the at least three chirps and information from a global positioning system.

11. The system of claim 10, wherein the support vessel sends the absolute location to the guiding AUV.

12. The system of claim 10, wherein the support vessel sends the absolute location of the guiding AUV to other vessels that participate in the marine acquisition seismic system to adjust their shooting.

13. The system of claim 6, further comprising:
    peripheral AUVs that are guided by the guided AUVs.

14. The system of claim 6, further comprising:
    peripheral AUVs that are guided by another guiding AUV.

15. A method for guiding autonomous underwater vehicles (AUVs) during a marine seismic acquisition survey, the method comprising:
    driving a guiding AUV along a given path;
    emitting at least three chirps from an acoustic positioning system attached to, and located outside of, the guiding AUV;
    recording the at least three chirps at a guided AUV;
    calculating a relative position of the guided AUV relative to the guiding AUV;
    adjusting a location of the guided AUV, with a propulsion system, if a difference between the relative position and a given position stored on board is larger than a given threshold; and
    recording seismic data with the guided AUVs,
    wherein the guiding AUV drifts with water currents during the seismic survey and uses the propulsion system only to correct its position.

16. The method of claim 15, further comprising:
    calculating at a support vessel an absolute location of the guiding AUV.

17. The method of claim 16, further comprising:
    transmitting the absolute location of the guiding AUV to other vessels of the seismic survey for adjusting their shooting.

18. The method of claim 16, further comprising:
    transmitting the absolute location from the support vessel to the guiding AUV to adjust its position relative to a given pre-plot.

* * * * *